United States Patent Office 3,328,116
Patented June 27, 1967

3,328,116
SOLVENT EXTRACTION PROCESS FOR THE
RECOVERY OF Be-VALUES
Robert R. Grinstead, Walnut Creek, Calif., assignor to
The Dow Chemical Company, Midland, Mich., a corporation of Delaware
No Drawing. Filed Oct. 9, 1963, Ser. No. 314,860
7 Claims. (Cl. 23—23)

ABSTRACT OF THE DISCLOSURE

The invention is a process for extracting high purity beryllium values from beryllium leach liquors containing other dissolved cationic and molecular impurities. In the process, the beryllium values are extracted into an aliphatic carboxylic acid which is substantially immiscible in the beryllium containing feed stock. This action is carried out in conjunction with a pre- or post-treatment with a chelating agent for ions other than beryllium. Also, a scrub of the extract with a dilute mineral acid to remove contaminants is employed.

The so-purified beryllium values can be recovered from the carboxylic acid extract in a variety of ways.

This invention relates to the recovery of beryllium and more particularly is concerned with a novel process for obtaining high purity beryllium compounds from impure beryllium containing feed materials.

It is a principal object of the present invention to provide a novel process for recovering high purity beryllium compounds from both low and medium grade beryllium concentrates.

It is another object of the present invention to provide a novel process using a minimum of manipulative steps for obtaining high purity beryllium compounds in good yield from leach liquors and other beryllium containing sources having large amounts of ionic and other impurities.

A further object of the present invention is to provide an economical process for recovering high purity beryllium values dissolved in aqueous solutions having large amounts of iron and aluminum also dissolved therein.

It is also an object of the present invention to provide an extraction process for recovering and obtaining beryllium values in high yields and high purity which also provides for minimal losses of extracting agents.

These and other objects and advantages will become apparent from the detailed description presented hereinafter.

Ordinarily, in the present process, a solution containing dissolved beryllium values which ordinarily also contains large amounts of other dissolved cationic and molecular impurities along with the beryllium first is treated with a chelating agent which forms non-extractable chelates with the various metallic ion impurities other than beryllium. The minimum amount of chelating agent to be employed is that which is sufficient to tie-up the contaminating ion species. (Ordinarily, the beryllium containing solution is made from about 0.001 to about 1 molar with respect to said chelating agent.)

The pH of the reaction solution is adjusted to be in the range of from about 4 to about 7 and preferably from about 4.5 to about 5.

An extractant for the beryllium values, i.e., an aliphatic carboxylic acid which is substantially insoluble in the solution and is stable in the presence of the processing materials employed in the process, is added to the beryllium containing source solution and the resulting admixture stirred at a temperature of from about 0° to about 80° C. for a period of from about 5 minutes to about 2 hours or more thereby preferentially extracting the beryllium values into the organic phase. The carboxylic acid can be used directly by itself as an extractant. However, ordinarily, for ease of handling, a solution of the extractant which is immiscible in the feed stock is used. In this latter case, the carboxylic acid extractant for beryllium is dissolved in the solvent to provide a solution containing at least about 20 volume percent of the extractant. Preferably, the extractant solution contains from about 30 to about 60 volume percent of the carboxylic acid member.

The resulting beryllium value containing organic extract, after separation from the residual beryllium depleted solution, is scrubbed with dilute mineral acid at a temperature of from about 10 to about 80° C., preferably at from about 20 to about 30° C. for a period of from about 5 to about 60 minutes and preferably from about 15 to about 30 minutes in order to remove coextracted contaminating metal ions. The beryllium values then are recovered from the scrubbed extract.

In many instances, this mineral acid scrub treatment is sufficient to separate and remove undesirable contaminants from the beryllium. In these cases, the chelating agent treatment step can be eliminated from the process.

The actual recovery of the beryllium from the organic extract ordinarily is carried out by treating the extract with aqueous hydrofluoric acid or other concentrated mineral acids at an organic extract stripping acid ratio of from about 1 to 12/1.

The high purity beryllium compounds obtained by the present process can be used directly or converted into other compounds and products as is readily understood by one skilled in the art.

As an alternative to the hereinbefore disclosed process, the chelating of the contaminating cations can be carried out after extraction of beryllium from the aqueous leach liquor by scrubbing with an aqueous chelating agent solution prior to the stripping of the desired beryllium values from the carboxylic acid extractant. Also, as indicated hereinbefore, interfering metal ion contaminants can be removed by use of the dilute mineral acid scrubbing stage alone thereby eliminating the use of the chelating agent in the process.

Beryllium containing solutions which are operable in the present process are aqueous and other beryllium containing solutions which are not miscible with the carboxylic acid extractant and which do not include anions, e.g., fluoride, which will heavily complex beryllium. Ordinarily, acidic aqueous liquors resulting from the leaching of beryllium ores and other beryllium sources are subjected to treatment by the instant novel process.

Chelating agents which are operable in the present process are those which have substantially no effect on beryllium but which readily tie up iron and aluminum as these latter values ordinarily are found in large concentrations in leach liquors obtained from beryllium ores. Ethylenediamine-tetraacetic acid has been found to be particularly effective. Oxalic acid and nitrilotriacetic acid are examples of other suitable chelating agents.

Extractants for the beryllium values are those solid and liquid aliphatic carboxylic acids which are substantially immiscible in the beryllium feed stock. Generally, branched chain aliphatic monocarboxylic acids having from about 5 to about 19 carbon atoms are employed, 2-ethylhexoic acid being a preferred species.

Diluents for the carboxylic acid extractant are any solvents for these acids which are stable to the mineral acid reagents employed in the process and which are substantially immiscible in the beryllium containing feed liquor. With the acidic aqueous beryllium containing leach liquors substantially water-immiscible organic materials which dissolve the carboxylic acid beryllium extractant and which are stable to the scrub and stripping acids are employed. Suitable diluents include, for example, nitroalkanes, alkyl nitrites, alkaryl ethers, chlorinated aliphatic hydrocarbons (e.g., $CCl_4$, $CHClCCl_2$, $CHCl_3$), mineral spirits, esters of aliphatic carboxylic acids (e.g., amyl acetate), light mineral oil fractions and the like.

The amount of carboxylic extractant or solution of extractant to be employed is not critical so long as there is sufficient amount of extractant present to remove the beryllium values from the feed stock. Ordinarily an excess of the extractant is employed to promote the extracting operation. For ease of handling an amount of liquid acid or solution of either a liquid or solid branched chain carboxylic acid extractant in an amount to range in total volume from about 1/30 to about 30/1 of the volume of the aqueous beryllium containing feed liquid usually is employed.

In general, dilute aqueous mineral acids such as sulfuric, hydrochloric, phosphoric, boric and the like of from about 0.1 to about 9 molar can be used as scrubbers. For economical processing either dilute hydrochloric acid or from about 3 to about 6 molar or sulfuric acid of from about 4 to about 8 molar ordinarily is employed. The amount of scrubbing solution to be employed is not critical except that excessively large amounts tend to unduly increase beryllium losses. Ordinarily, the volume ratio of scrub acid/beryllium containing carboxylic acid extract ranges from about 1/30 to about 30/1.

The effectiveness of the scrubbing step for removing any extracted aluminum, iron and other cationic values from the beryllium containing carboxylic acid extract results from the surprisingly much lower rate of extraction of beryllium values into the scrub solution in comparison to the contaminant cationic species. If the scrubbing period is extended for periods much beyond that indicated, especially at the higher temperatures and upper indicated concentrations of acid, e.g., about 9 molar HCl, detrimental losses of beryllium into the scrub medium may be encountered.

Hydrofluoric acid is a particularly suitable acid for recovering the purified beryllium values from the scrubbed organic extractant in the recovery stage as this reagent directly produces high purity beryllium fluoride. However, if other high purity beryllium compounds are desired, other concentrated acids, such as hydrochloric acid, nitric acid, or phosphoric acid, for example can be used for recovery of the beryllium from the extract.

In a preferred embodiment of the present process, crude acidic aqueous solutions obtained in the leaching of beryllium ores are treated with ethylenediaminetetraacetic acid (EDTA) chelating agent. The minimun amount of EDTA to be employed is that which is sufficient to tie up various metallic ion impurities (iron and aluminum ordinarily being the chief contaminants and both being present in large quantities) as chelates which are substantially non-extractable by the organic extractant for beryllium. Ordinarily with beryllium leach liquors obtained in commercial operation, the leach solution will be made from about 0.01 to about 1.0 molar in EDTA.

The EDTA treated leach liquor is adjusted to a pH of from about 4.5 to about 5, preferably by additions of aqueous ammonia.

Extraction of the beryllium from the acidic leach liquor is accomplished by agitating the solution with 2-ethylhexoic acid. Preferably, the acid is employed as a solution in kerosene having a concentration of from about 30 to about 60 percent by volume of the acid. The extraction is carried out over a temperature range of from about 20 to about 50° C. for a period of from about 0.25 to about 1.5 hours or more.

At a pH greater than above 5, the 2-ethylhexoic acid extractant becomes increasingly soluble in the aqueous phase with accompanying reagent losses. However, if there is no concern for these 2-ethylhexoic acid losses, the operable pH range can be extended to as high as from about 6.5–7 if desired.

Following the extraction of the beryllium values from the leach liquor into the carboxylic acid extractant, the organic and aqueous phases are separated.

The so-purified beryllium values preferably are recovered from the carboxylic acid extractant by stripping with concentrated aqueous hydrochloric or hydrofluoric acid, hydrofluoric acid being particularly effective.

With concentrated hydrochloric acid, stripping of the beryllium values preferably is carried out over a period of from less than 1 hour to about 2 hours at a temperature of from about 60 to about 80° C. using acid of at least from about 10 to about 12 molar concentration. Extraction of the beryllium values can be achieved by use of less dilute hydrochloric acids and at lower temperatures, e.g., room temperature, i.e., about 18 to about 25° C. However, the extraction rate is slower as was indicated hereinbefore with reference to the scrub stage.

With hydrofluoric acid a strip time of about 5 to about 120 minutes, preferably from about 15 to about 60 minutes, at a temperature of from about 10° to about 80° C., preferably from about 25° to about 50° C., using acid ranging from about 10 to about 60 weight percent, preferably from about 25 to about 50 weight percent in HF ordinarily is employed.

The present process is carried out in batch type, cyclic and continuous operations using material handling, transport and processing equipment that is not detrimentally attacked by the reactants and which has the structural stability to withstand the process conditions.

The following examples will serve to further illustrate the present invention but are not meant to limit it thereto.

*Example 1*

A crude hydrated beryllium sulfate product was obtained by extracting dissolved beryllium values present in an acidic leach of beryl ore into a mono- or dialkyl substituted orthophosphoric acid having from about 4 to about 18 carbon atoms on each alkyl group followed by stripping of the beryllium from the alkyl phosphate reactant by sulfuric acid. This crude product had impurity contents which included about 36,000 parts per million aluminum and about 3,600 parts per million iron based on the beryllium present expressed as beryllium oxide, BeO.

About 5 grams of the hydrated $BeSO_4$ to which had been added a tracer of radioactive beryllium material, was dissolved in about 60 cubic centimeters of water. Sufficient ethylenediamine tetraacetic acid was added to provide a solution about 0.1 molar with respect to this chelating agent. The pH of the solution was adjusted to about 4.5–5 by aqueous ammonia. About 40 cubic centimeters of a solution of 2-ethylhexoic acid in kerosene (50—50 mixture of acid and kerosene) was added and the resulting two-phase mixture stirred at room temperature, i.e., about 18–25° C. for about one hour while maintaining the pH at between about 4.5–5.0. By use of standard counting techniques on the tracer beryllium values present in the feed, it was determined that about 97 percent of the beryllium values present had been extracted into the carboxylic acid.

The organic phase was seperated from the beryllium poor aqueous liquid and stirred with about 10 cubic centimeters of 6 molar aqueous hydrochloric acid for about 2¼ hours at room temperature. Only about 3 to 4 percent of the beryllium present in the carboxylic acid extract was lost to the hydrochloric acid scrub solution during this stage.

The organic extract then was agitated at about 60° C. with about 8 cubic centimeters of 12 molar aqueous hydrochloric acid for about 1⅔ hours. About 95% of the beryllium concentration present in the scrubbed organic phase was stripped by this operation.

The resulting aqueous, acidic beryllium rich phase was diluted with additional water and ammonia added to precipitate the beryllium values as beryllium hydroxide. This precipitate was separated from the residual aqueous stripping liquor, washed and dried. The recovery of beryllium values based on BeSO₄ hydrate feed was about 88.5% overall. The resulting product was analyzed by emission spectroscopy. The analytical results obtained for the present product as well as specifications for corresponding constituents established by the Atomic Energy Commission for nuclear grade BeO (for comparison purposes) are presented in Table I.

TABLE I

[Values expressed as parts per million Be]

| Constituent | Present Product | U.S. AEC Spec. NP-100-A for nuclear grade BeO |
|---|---|---|
| Fe | 36 | 1,600 |
| Al | 14 | 1,400 |
| Cu | 22 | 150 |
| V | 28 | |
| Mn | <6 | 150 |
| Si | 75 | 1,000 |
| Mg | 230 | 600 |
| B | <28 | 2 |
| Na | <28 | |
| Pb | <28 | 20 |
| Bi, Sn, Ti | <28 | |
| Ni | <28 | 400 |
| Cd | <28 | 2 |
| Cr | <28 | 300 |
| Mo | <28 | 20 |
| Co | <280 | 5 |
| Ca | <280 | |
| P | <280 | |
| Sb, Te, Sr | <280 | |
| Zn | <280 | 200 |
| Hg | <280 | |

The results clearly show the utility of the present process for preparing a high purity beryllium material especially low in iron and aluminum from a crude feed stock containing large quantities of these interfering contaminants.

*Example 2*

A number of runs were made to evaluate the effectiveness of various chelating agents, especially for Al which is particularly hard to separate from beryllium. These runs also served to determine the effect of the chelating agent on the subsequent extraction of beryllium values into the carboxylic acid extractant.

In these studies, a solution about 0.1 molar in AlCl₃ (equivalent to about 2.7 grams Al⁺⁺⁺/per liter), about 0.1 molar BeCl₂ and about 4 molar in NH₄Cl and about 0.2 molar in a chelating agent was contacted for about 30 minutes at room temperature with solution of 2-ethylhexoic acid in kerosene (50/50 volume percent) at a carboxylic acid/aqueous feed solution ratio of about 1:2. The pH of the feed solution was either adjusted to be 4.5 or 5.0. After the test period, the organic acid phase and aqueous phase were separated and the extraction coefficient $$\left(K = \frac{[Be]_{organic}}{[Be]_{aqueous}}\right)$$

for beryllium determined. The concentration of aluminum values in the organic phase also was found. Table II summarizes the results of these tests.

TABLE II

| Run No. | Chelating Agent | Solution, pH | Al Conc. in Org. Phase, g./l. | K org./aqueous, Be |
|---|---|---|---|---|
| 1 | Oxalic Acid | 4.5 | 2.0 | 500 |
| 2 | do | 5.0 | 0.30 | 600 |
| 3 | Nitrilotriacetic Acid | 4.5 | 0.003 | 47 |
| 4 | do | 5.0 | 0.013 | 114 |

A similar study with this same acidic chloride beryllium containing solution using 2-ethylhexoic acid alone as extractant, also at a 1:2 organic acid: aqueous solution phase ratio, and ethylenediaminetetracetic acid as the chelating agent, at pH about 4.5 and a contact time of about 1.5 hours, the extraction coefficient $$K = \frac{org.}{aqueous}$$

for beryllium into the 2-ethylhexoic acid was greater than 400 and the aluminum concentration in this phase at the end of the run was only about 0.001 gram/liter.

These studies show the effectiveness of various chelating agents in tying up undesirable aluminum ions to prevent their extraction into the carboxylic acid extractant for beryllium as well as demonstrate the effectiveness of the present process in removing beryllium values from acidic aqueous chloride solutions.

*Example 3*

The effectiveness of a dilute mineral scrub in removing aluminum and iron ionic species which might have been extracted into the organic phase was determined by scrubbing a 2-ethylhexoic acid-kerosene solution (50/50 by volume) containing 0.75 gram/liter Al⁺⁺⁺ and 0.25 gram/liter Fe⁺⁺⁺ at room temperature with either dilute aqueous HCl or H₂SO₄ at an organic/aqueous phase ratio of about 1. Table III presents the results of a number of runs at various acid concentrations and scrub times.

TABLE III

| Run No. | Scrub Agent | Contact Time (min.) | Final Concentration in Organic Phase, g./l. | |
|---|---|---|---|---|
| | | | (Al) | (Fe) |
| 1 | 3M HCl | 35 | 0.020 | 0.001 |
| 2 | 6M HBr | 21 | 0.010 | 0.002 |
| 3 | 4M H₂SO₄ | 16 | 0.001 | 0.001 |
| 4 | 8M H₂SO₄ | 16 | 0.010 | 0.001 |

*Example 4*

The effectiveness of concentrated hydrochloric and hydrofluoric acid stripping solutions for recovery of the beryllium values from the carboxylic acid extractant was evaluated. In this series of tests, a solution of 2-ethylhexoic acid in kerosene (50/50 by volume) loaded with a predetermined amount of beryllium ion was agitated with a known quantity of concentrated hydrochloric or hydrofluoric acid for a predetermined period of time and the amount of beryllium removed from the organic phase determined. Table IV presents the results of these studies.

TABLE IV

| Run No. | Contact time (min.) | Be removed from organic phase, Percent |
|---|---|---|
| REACTION MIX | | |

38 cc. 50% 2-ethylhexoic acid-50% kerosene c't'g 7.0 g./l. Be⁺⁺.
6 cc. 12 m. HCl; volume ratio org./aq. 6.33.
Temperature 60° C.

| | | |
|---|---|---|
| 1 | 20 | 44 |
| 2 | 40 | 63 |
| 3 | 100 | 93 |

REACTION MIX 18 cc. 50% 2-ethylhexoic acid-50% kerosene c't'g 12.7 g./l. Be⁺⁺.
8 cc. 12 m. HCl; volume ratio org./aq. 2.75.
Temperature—room (18-25° C.).

| | | |
|---|---|---|
| 4 | 20 | 5 |
| 5 | 60 | 6 |
| 6 | 110 | 21 |

REACTION MIX 20 cc. 50% 2-ethylhexoic acid-50% kerosene c't'g 10 g./l. Be⁺⁺.
1.6 cc. 50% HF; volume ratio org./aq. 12.5.
Temperature—room (18-25° C.).

| | | |
|---|---|---|
| 7 | 60 | 99 |

*Example 5*

Solutions of either α-methyl butyric acid or 2-ethylhexoic acid in a diluent to provide a carboxylic acid concentration of about 33% by volume were agitated at room temperature with a beryllium sulfate solution containing aluminum as a contaminant and diammonium ethylenediaminetetraacetate as chelating agent. The reaction mixture was maintained at a pH of about 5.0 during the extraction. The results of a number of tests with various solvents for the branched chain carboxylic acid extractants are summarized in Table V.

TABLE V

| Run No. | Carboxylic Acid Extractant | Solvent | Extraction Time (min.) | Initial Phase Ratio, org./aq. | Distribution Coefficient for Be, org./K aqueous |
|---|---|---|---|---|---|
| 1 | α-Methyl butyric acid | Kerosene | 20 | ¼ | 9.0 |
| 2 | 2-ethylhexoic | do | 10 | ½ | 4.9 |
| 3 | do | do | 30 | ½ | 28.0 |
| 4 | do | Trichloroethylene | 30 | ½ | 41.0 |
| 5 | do | Amyl acetate | 30 | ½ | 22.0 |
| 6 | do | Mineral spirits | 30 | ½ | 35.0 |

In a manner similar to that described for the foregoing examples, caproic acid, heptanoic acid, valeric acid, lauric acid, stearic acid, myristic acid, capric acid, palmitic acid and the like can be used to extract the beryllium values from a leach liquor and co-extracted impurities readily be scrubbed therefrom by treatment with dilute hydrochloric acid thereby to provide a source of high purity beryllium values.

Various modifications can be made in the present invention without departing from the spirit or scope thereof for it is to be understood that I limit myself only as defined in the appended claims.

I claim:
1. A process for preparing a high purity beryllium material which comprises;
   (a) providing a feed stock solution containing dissolving beryllium values and other dissolved metallic ion impurities.
   (b) adjusting the pH of said feed stock solution to a range of from about 4 to about 7,
   (c) contacting the solution with an aliphatic carboxylic acid extractant for the beryllium values at a temperature of from about 0° to about 80° C. for a period of from about 5 minutes to about 2 hours, said carboxylic acid having a carbon chain of from about 5 to about 19 carbon atoms, said carboxylic acid being substantially insoluble in said feed stock solution thereby to preferentially extract said beryllium values from said solution,
   (d) scrubbing the beryllium containing carboxylic acid extract with a dilute mineral acid at a temperature of from about 10 to about 80° C. thereby to remove contaminating materials therefrom, and
   (e) treating the resulting scrubbed beryllium containing carboxylic acid extract with a concentrated mineral acid at an organic extract/concentrated mineral acid ratio of from about 1 to about 12 thereby to recover a high purity beryllium material from the carboxylic acid extract of said beryllium.

2. The process as defined in claim 1 wherein the aliphatic extractant is a branched chain acid.

3. A process for preparing a high purity beryllium material which comprises;
   (a) providing a feed stock solution containing dissolved beryllium values and other dissolved metallic ion impurities,
   (b) treating said solution with a chelating agent which forms chelates with metallic ions other than beryllium,
   (c) adjusting the pH of the solution to a range of from about 4 to about 7,
   (d) contacting the solution with an aliphatic carboxylic acid extractant for the beryllium values at a temperature of from about 0° to about 80° C. for a period of from about 5 minutes to about 2 hours, said carboxylic acid having a carbon chain of from about 5 to about 19 carbon atoms, said carboxylic acid being substantially insoluble in said feed stock solution thereby to preferentially extract said beryllium values from said solution,
   (e) scrubbing the beryllium containing carboxylic acid extract with a dilute mineral acid at a temperature of from about 10° to about 80° C. for a period of from about 5 to about 60 minutes thereby to remove contaminating materials therefrom, and
   (f) treating the resulting scrubbed beryllium containing carboxylic acid extract with a concentrated mineral acid at an organic extract/concentrated mineral acid ratio of from about 1 to about 12 thereby to recover a high purity beryllium material from the carboxylic acid extract of said beryllium.

4. The process as defined in claim 3 wherein the aliphatic acid extractant is a branched chain acid.

5. A process for preparing high purity beryllium compounds which comprises:
   (a) providing an aqueous, acidic solution containing dissolved beryllium values and dissolved iron and aluminum,
   (b) treating said solution with a chelating agent for said iron and aluminum, said chelating agent being a member selected from the group consisting of ethylenediamine tetraacetic acid, oxalic acid and nitrilotriacetic acid, the amount of said chelating agent being sufficient to tie up said iron and aluminum,
   (c) adjusting the pH of the so-treated solution to from about 4 to about 7,
   (d) contacting said solution with a branch-chain carboxylic acid which is substantially immiscible in the aqueous solution, said acid being a member selected from the group consisting of α-methyl butyric acid and 2-ethylhexoic acid, the volume of said carboxylic acid ranging from about 1/30 to about 30 times the volume of said aqueous solution,
   (e) agitating said mixture at a temperature of from about 0 to about 80° C. for a period of from about 5 minutes to about 2 hours thereby to preferentially extract said beryllium values into said organic phase,
   (f) separating said carboxylic acid phase and said aqueous solution,
   (g) scrubbing the organic extract with a mineral acid selected from the group consisting of hydrochloric acid of from about 3 to about 6 molar and sulfuric acid of from about 4 to about 8 molar, the ratio of the scrub acid to the beryllium containing carboxylic acid extract ranging from about 1/30 to 30/1, and
   (h) stripping the resulting high purity beryllium values from said carboxylic acid extractant with a member selected from the group consisting of aqueous hydrochloric acid of from about 10 to about 12 molar and aqueous hydrofluoric acid of from about 25 to about 50 weight percent in HF at an organic extract/stripping acid ratio of from about 1 to about 12.

6. The process as defined in claim 5 wherein the carboxylic acid extractant is employed as a solution containing from about 30 to about 60 volume percent of said extractant, and the solvent being a substantially water-immiscible liquid organic material stable to the scrub acids and stripping acids employed.

7. A process for recovering high purity beryllium values from impure beryllium containing leach liquors which comprises:
   (a) providing an acidic aqueous leach liquor obtained from the leaching of a beryllium ore, said liquor containing dissolved beryllium values and having dissolved aluminum and iron impurities therein,
   (b) treating said leach liquor with ethylene-diamine tetraacetic acid to provide a solution about 0.1 molar with respect to said ethylenediaminetetraacetic acid,
   (c) adjusting the pH of said leach liquor to from about 4.5 to about 5,
   (d) contacting said liquor with a solution of 2-ethylhexoic acid in kerosene, said solution containing about 50 volume percent each of said 2-ethylhexoic acid and said kerosense, the amount of said solution being about 0.7 of the volume of said aqueous leach liquor,
   (e) agitating the mixture of said liquor and said ethylhexoic acid at room temperature for about 2 hours thereby to extract said beryllium values into ethylhexoic acid phase,
   (f) separating the beryllium depleted aqueous liquor and said beryllium containing 2-ethylhexoic acid extract,
   (g) scrubbing said 2-ethylhexoic acid extract with about 6 molar hydrochloric acid at room temperature at an organic phase/hydrochloric acid scrub acid volume ratio of about 4,
   (h) separating the aqueous scrub acid from said 2-ethylhexoic acid extract,
   (i) stripping high purity beryllium values from said 2-ethylhexoic acid extract by contacting said extract with 12 molar aqueous hydrochloric acid at about 60° C., the volume ratio of said organic phase to said 12 molar hydrochloric acid being about 5.

References Cited

UNITED STATES PATENTS

| 3,145,081 | 8/1964 | Surls et al. | 23—312 X |
| 3,251,646 | 5/1966 | Alon et al. | 23—312 X |

OTHER REFERENCES

Banerjee et al.: Analytica Chimica Acta, vol. 10, No. 3, March 1954, pages 256–259.

Moore: Purification of Beryllium Compounds: A Literature Survey Oak Ridge National Laboratory Report, June, 1960, p. 24.

Sundaram et al.: Analytica Chimica Acta, vol. 8, No 6, June 1953, pp. 526–529.

OSCAR R. VERTIZ, *Primary Examiner.*

H. T. CARTER, *Assistant Examiner.*